Aug. 27, 1963     L. K. V. SUDROW     3,101,917
DUCTED ROTOR WITH PRESSURE BALANCING AND LIFT AUGMENTING MEANS
Filed Nov. 27, 1961     2 Sheets-Sheet 1

INVENTOR.
LYLE K. V. SUDROW
BY
Knox & Knox

3,101,917
DUCTED ROTOR WITH PRESSURE BALANCING AND LIFT AUGMENTING MEANS
Lyle K. V. Sudrow, Los Angeles, Calif., assignor to Helipod, Inc., Oceanside, Calif.
Filed Nov. 27, 1961, Ser. No. 155,096
3 Claims. (Cl. 244—23)

The present invention relates generally to aircraft propulsion and more particularly to a ducted rotor with pressure balancing and lift augmenting means.

The primary object of this invention is to provide a ducted rotor for aircraft lift and propulsion in which the duct has vented portions allowing air transfer flow into and out of the duct in various directions of flight, in order to balance pressure over the total area of the duct and avoid low pressure areas which might cause loss of lift.

Another object of this invention is to provide a ducted rotor in which the upper portion of the duct, designed to conduct air flow smoothly into the duct, constitutes an annular lifting ring of substantially airfoil section, which provides lift augmentation, particularly in vertical flight and hovering.

A further object of this invention is to provide a ducted rotor in which the pressure balancing means may be applied to the entire duct annulus, or to portions thereof and may be air passages.

Finally, it is an object to provide a ducted rotor of the aforementioned character which is simple and convenient to manufacture and is adaptable to various configurations of vertical take-off and landing aircarft.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

General Structure

Figure 1:
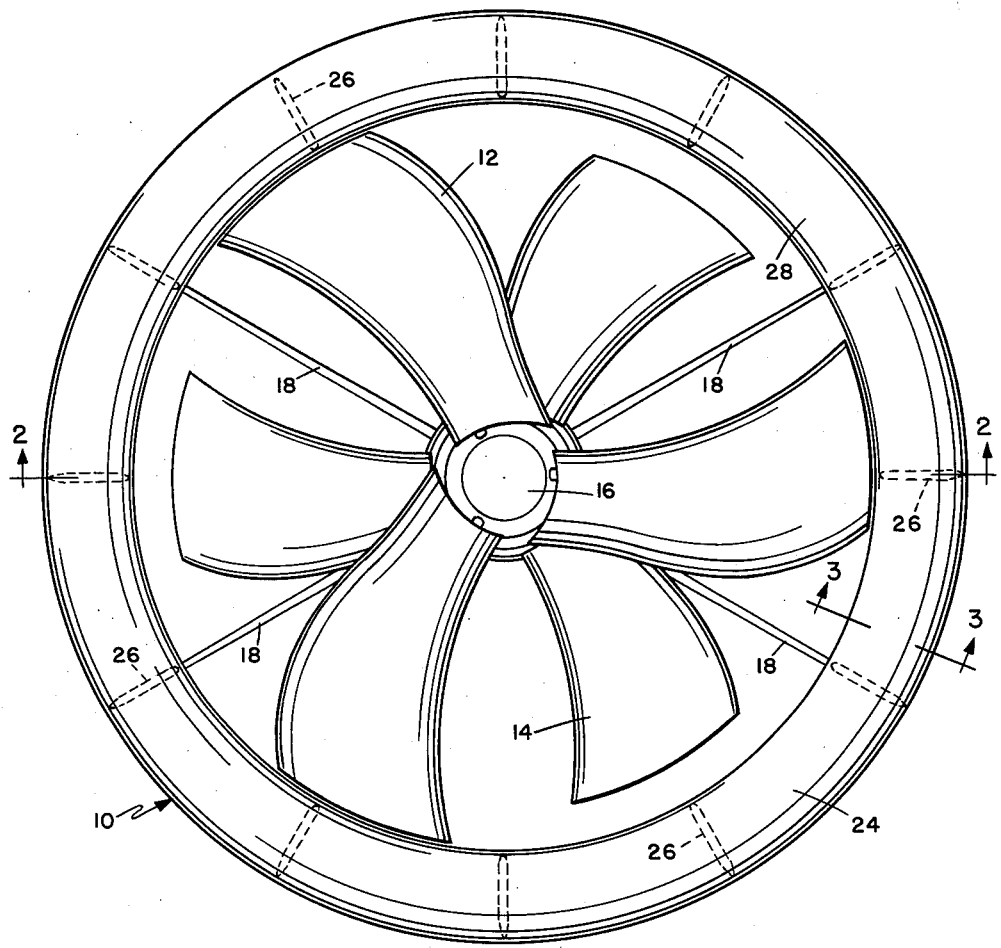
FIGURE 1 is a top plan view of the complete ducted rotor.
Figure 2:
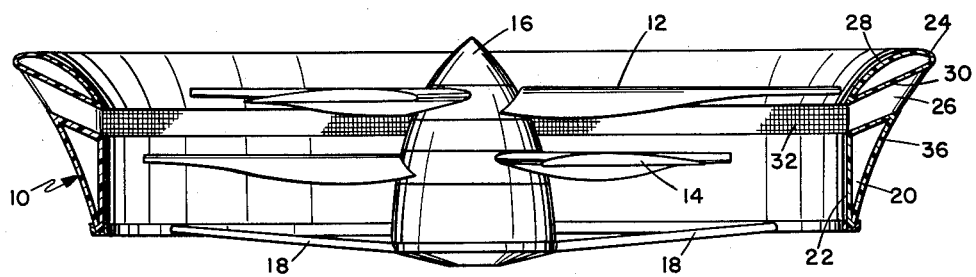
FIGURE 2 is a sectional view taken on line 2—2 of FIGURE 1.
Figure 3:
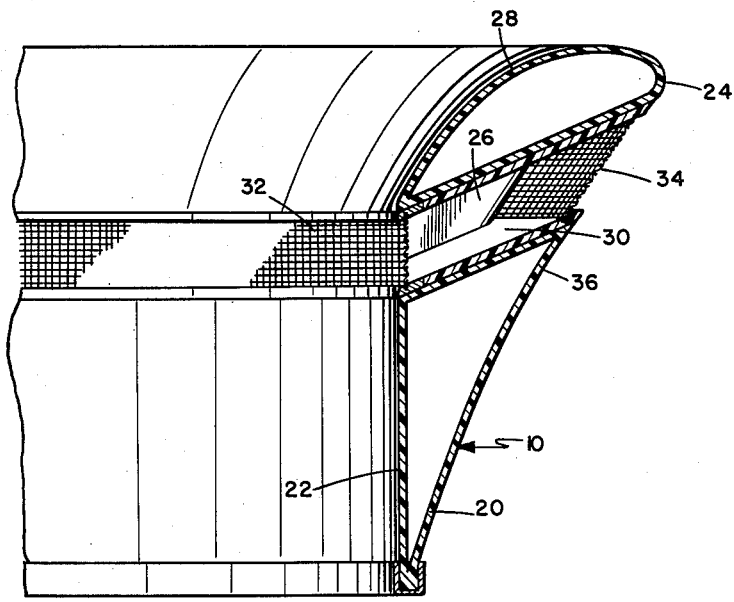
FIGURE 3 is an enlarged sectional view taken on line 3—3 of FIGURE 1.

Referring now to FIGURES 1–3 of the drawings, the assembly includes a circular duct 10 in which are mounted coaxial, counter-rotating rotors 12 and 14. The upper rotor 12 and lower rotor 14 are mounted on a central hub 16 attached to the duct 10 by radial support arms 18 and are driven by any suitable means. The complete assembly can be mounted above an airframe structure to provide all lift and propulsion power, or may be incorporated as part of a multiple power unit aircraft, the specific use not being critical to the present disclosure. The rotors are illustrated as having wide, short span blades of a particular type, the arrangement being fully described in my copending application for a Ducted Sustaining Rotor for Aircraft, Serial No. 141,765, filed September 29, 1961. However, other rotor configurations may be used to advantage with the particular duct.

The illustrated duct 10 has a hollow lower portion 20 with a substantially vertical inner wall 22 and an upper, annular lifting ring 24 spaced above the lower portion on streamlined supports 26 at suitable intervals. The lifting ring 24 is substantially airfoil shaped in its radial cross section with the leading edge thereof at the outer periphery the convex upper surface forming the inlet lip 28 of the duct. The lifting ring is disposed with its airfoil section at a positive angle of attack relative to radially incoming airflow, so that the gap between the lifting ring and the lower portion forms an inwardly and downwardly extending, annular slot 30. The slot 30 is fitted with gating means such as an inner perforate panel 32 forming an extension of inner wall 22 and covering all or part of the inner end of the slot. Similarly, the outer end of the slot is closed as a whole or in part by an outer perforate panel 34, following the contour of the outer wall 36. The perforate panels may be of screen or mesh material, or may actually be sheet-like panels with numerous perforations to permit airflow. Various methods of securing the perforate panels may be used, the drawings indicating, as an example, annular grooves in which the edges of the panels are seated. It should be noted that annular slot 30 opens into the interior of the duct immediately below upper rotor 12 where the initial lift occurs.

Operation

In ducted rotor installations it has been found that air pressure in various parts of the duct is not constant, particularly in lateral flight. This is primarily due to transverse air flow across the duct causing pressure drop and turbulence at the upstream side of the duct, combined with pressure increase at the downstream side of the duct due to inwardly spilling air. Such variations in pressure cause variations in the effectiveness of the rotor at different parts of the swept disc of the rotor blades, resulting in unsymmetrical lift and possible instability. This is particularly true with the wide bladed rotor illustrated, which is in fact a rotary lifting wing, rather than a fan or propeller which produces thrust by downward mass flow of air. It is desirable, therefore, to balance the air pressure as evenly as possible across the duct, in order to achieve optimum lift over the entire swept disc area of the rotor.

The annular slot 30 allows the duct to "breathe" by permitting air flow into and out of the duct in the region of initial lift generation, immediately below the upper rotor. This is especially effective in lateral flight, where ram effect causes air flow into what would normally be a low pressure region on the side of the duct toward the direction of flight. The perforate panels 32 and 34 control the air flow and prevent high speed cross flow which might interfere with the lifting flow over the rotor blades.

The lifting ring 24 develops considerable lift from air flow into the duct over the convex inlet lip 28, the effect being increased by the air flow through slot 30 below the airfoil of the lifting ring. In vertical flight the extra lift is very beneficial and it has been found that a considerable radially inward flow of air is induced. In forward flight, the forwardly directed portion of the lifting ring 24 develops useful lift in the manner of a fixed wing.

Modified Structure

Figure 4:
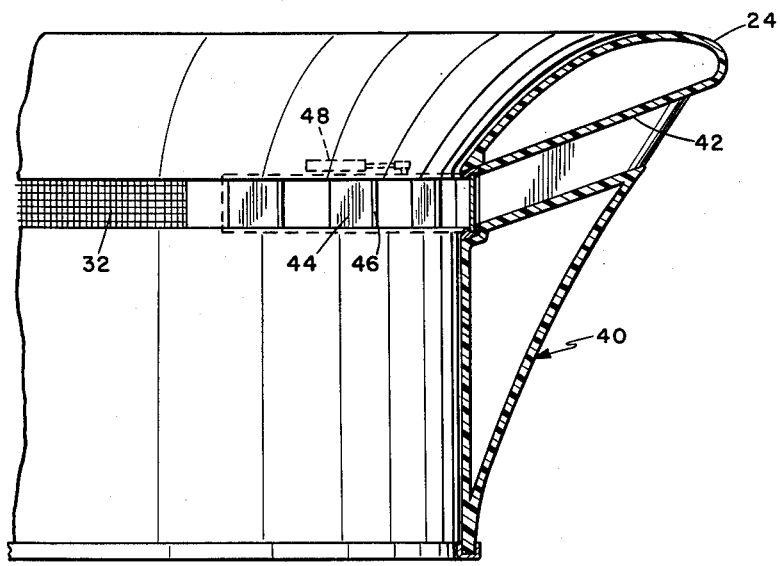
FIGURE 4 is a sectional view similar to FIGURE 3, showing a modified form of structure.

For high speed forward flight, using the ducted rotor as the primary propulsion means, it may be desirable to have additional air flow across the duct in the direction of flight. For this purpose, one or more portions of the duct 40, illustrated in FIGURE 4, may be provided with an adjustable inlet slot 42 incorporated into the annular slot below the lifting ring 24. Instead of the perforate panels, the inlet slot 42 is fitted with a slidable shutter 44 having openings 46 through which air can be admitted directly to the duct. The shutter 44 may be operated by a suitable jack 48, the details of such an arrangement being fully described in my copending application for Forward Thrust Means for Ducted Rotor Sustained Aircraft, Serial No. 138,629, filed September 18, 1961. Combined with the annular slot for pressure balancing, the controllable inlet slot provides a considerable degree of control of duct airflow conditions to suit particular flight characteristics.

The precise location, angular disposition and proportions of the air flow slot are variable to suit specific performance requirements as is the airfoil shape of the lifting ring. The slot need not be entirely continuous, but could be divided into sections if structural requirements so dictate. In the basic slot structure, no moving parts are involved and pressure balancing is automatic according to existing conditions.

It is understood that minor variation from the form of the invention disclosed herein may be made without departure from the spirit and scope of the invention, and that the specification and drawing are to be considered as merely illustrative rather than limiting.

I claim:

1. A ducted rotor assembly, comprising:
    a generally circular duct;
    a pair of counter-rotating driven rotors axially rotatably mounted in said duct;
    a wide airflow slot through said duct and extending circumferentially around at least a portion of the duct;
    said slot having perforate flow controlling panels secured therein; and
    the portion of said duct above said slot having a radial cross section of substantially airfoil shape with the leading edge thereof at the outer periphery.

2. A ducted rotor assembly according to claim 1 wherein said slot is inclined downwardly and inwardly into said duct, the inner end of the slot being disposed between the planes of the rotors.

3. A ducted rotor assembly, comprising:
    a generally circular lower duct portion; an annular lifting ring fixed to and spaced above said lower portion;
    said lifting ring having a radial cross section of substantially airfoil shape with the leading edge at the outer periphery thereof;
    a wide downwardly and inwardly inclined air flow slot between said lifting ring and said lower portion; and
    said slot having perforate flow control panels in certain portions and controllable gating means in other portions thereof.

References Cited in the file of this patent

UNITED STATES PATENTS

| 2,843,339 | Streib | July 15, 1958 |
| 2,935,275 | Grayson | May 3, 1960 |
| 2,980,365 | Yohe | Apr. 18, 1961 |

FOREIGN PATENTS

| 1,204,525 | France | Aug. 10, 1959 |
| 1,240,234 | France | July 25, 1960 |